(12) United States Patent
Channin et al.

(10) Patent No.: US 6,392,233 B1
(45) Date of Patent: May 21, 2002

(54) OPTOMECHANICAL RADIANT ENERGY DETECTOR

(75) Inventors: Donald Jones Channin, Lawrenceville; Francis Paul Pantuso, Robbinsville; Robert Amantea, Manapalan; Robert Raymond Michael, Maple Shade, all of NJ (US)

(73) Assignee: Sarnoff Corporation, Princeton, NJ (US)

( * ) Notice: Subject to any disclaimer, the term of this patent is extended or adjusted under 35 U.S.C. 154(b) by 31 days.

(21) Appl. No.: 09/635,552

(22) Filed: Aug. 10, 2000

(51) Int. Cl.[7] .................................................. G01J 5/34
(52) U.S. Cl. ..................... 250/338.1; 250/332; 250/234
(58) Field of Search ........................... 250/338.1, 338.4, 250/332, 334, 306

(56) References Cited

U.S. PATENT DOCUMENTS

| | | |
|---|---|---|
| 4,274,706 A | 6/1981 | Tangonan |
| 4,279,464 A | 7/1981 | Colombini |
| 4,622,662 A | 11/1986 | Laude et al. |
| 4,675,739 A | 6/1987 | Catchpole et al. |
| 4,681,440 A | 7/1987 | Burke et al. |
| 4,683,580 A | 7/1987 | Matsunaga |
| 4,696,536 A | 9/1987 | Albares et al. |
| 4,779,004 A | 10/1988 | Tew et al. |
| 4,786,831 A | 11/1988 | Morse et al. |
| 4,875,098 A | 10/1989 | Yamamoto et al. |
| 4,902,886 A | 2/1990 | Smisko |
| 4,943,491 A | 7/1990 | Norton et al. |
| 5,144,133 A | 9/1992 | Dudley et al. |
| 5,182,624 A | 1/1993 | Tran et al. |
| 5,290,102 A | 3/1994 | Kaiser et al. |
| 5,367,584 A * | 11/1994 | Ghezzo et al. ................. 385/17 |
| 5,420,428 A | 5/1995 | Bullington et al. |
| 5,436,452 A | 7/1995 | Kenny et al. |
| 5,449,908 A | 9/1995 | Wadsworth et al. |
| 5,450,512 A | 9/1995 | Asakura |
| 5,471,515 A | 11/1995 | Fossum et al. |
| 5,747,804 A | 5/1998 | Williams et al. |
| 5,770,856 A * | 6/1998 | Fillard et al. ................. 250/234 |
| 5,844,238 A | 12/1998 | Sauer et al. |
| 5,929,440 A | 7/1999 | Fisher |

FOREIGN PATENT DOCUMENTS

| | | |
|---|---|---|
| WO | WO 95/02170 | 1/1995 |
| WO | WO 95/02180 | 1/1995 |
| WO | WO 96/08701 | 3/1996 |

OTHER PUBLICATIONS

S. Horn and R. Buser, "Night Vision and Electronic–Sensors Directorate", SPIE, vol. 2020, Infrared Technology XIX, pp 304–321, Apr., 1993.
R.A. Wood, "Uncooled thermal imaging with monolithic silicon focal planes", SPIE, vol. 2020 Infrared Technology XIX, pp. 322–329, Apr. 1993.
C. Hanson, "Uncooled thermal imaging at Texas Instruments", SPIE vol. 2020 Infrared Technology XIX, pp. 330–339, Apr. 1993.
Oden et al., "Optical and Infrared Detection Using Microcantilevers", Department of Physics, University Of Tennesse, 10 pgs. (undated).

* cited by examiner

Primary Examiner—Scott J. Sugarman
Assistant Examiner—Richard Hanig
(74) Attorney, Agent, or Firm—William J. Burke (57) ABSTRACT

A MicroOptoElectroMechanical (MOEM) IR detector utilizes a novel combination of integrated MEMS and photonics to achieve high responsivity with low noise. Increasing incident radiant energy bends a bimaterial arm that moves a coupling waveguide into the evanescent field of a principal optical waveguide. This, in turn, modulates the light in the principal waveguide. This device has high detection sensitivity to incident radiation due to the combination of the length of the lever arm and the sensitivity of the evanescent field. The device exhibits low noise because photons are being modulated instead of electrons.

16 Claims, 8 Drawing Sheets

OPTOMECHANICAL RADIANT ENERGY DETECTOR

FIELD OF THE INVENTION

The invention relates to optomechanical radiant energy detectors and specifically to a micromechanical structure which responds to radiant energy by interrupting the transmission of waveguided light, thereby modulating the waveguided light to provide an output signal.

BACKGROUND OF THE INVENTION

The worldwide infrared (IR) camera market is projected to grow at over 25% per year, from $2 billion in 1999 to $8 billion in 2008. The key growth drivers are low cost, high-performance IR detectors. These detector modules will expand existing IR markets and create new ones, both in military markets and to a greater extent in the commercial sector.

One example of a key market application is predictive maintenance, currently, this market has a valuation of over $185 million. IR (Infra Red) sensors in this application are used to generate heat patterns that have been found to correlate with pending component failure. In the security and surveillance market, elimination of darkness defeats a perpetrator's natural advantage. In the $105 million process monitoring market, heat patterns in, for example, paper production correlate with paper quality and waste reduction.

The development of a high resolution, high sensitivity imager has the potential to greatly expand the marketplace. This can be attributed directly to reduced systems costs derived from savings in optics and electronics that result from leveraging the high performance of the new devices. The cost of IR optics for camera systems can be reduced in an inverse proportion to an increase in device performance and in proportion to a reduction in pixel size. As the costs are reduced, new unrealized markets may be able to benefit from the use of IR imaging and these high performance devices. These applications include the home security, marine, and automobile industries. Military users will also benefit from the growth in the commercial marketplace resulting from these high performance detectors in the form of lower costs, better reliability, and improved availability of sensors that meet military specifications.

Infrared imaging devices based upon photon-to-electron conversions can be extremely sensitive; however, a parallel process of thermal generation of electrons can produce significant detector noise. Consequently, photoelectric devices need to be cooled for effective use for infrared imaging. This leads to the use of dewars and cooling devices that add significant weight, bulk, and energy consumption to the imager. Thermal detectors, in contrast to photoelectric detectors, do not need to be cooled since they convert the broadband heat absorbed directly into some measurable signal. A significant gap exists, however, between the performance of the best of the current generation of uncooled IR imagers and that of cooled sensors. These "uncooled" detectors are limited by the ability to thermally isolate them from their surroundings, by the amount of noise they introduce in their detection process, and by the readout noise introduced by electronics. A 20 mK NE$\Delta$T (the temperature difference that gives a signal equal to the noise) appears to be the best uncooled sensitivity achievable for a microbolometer. In addition, manufacturing problems at this performance level are severe. With sufficient thermal isolation and reduced sensing noise, the sensitivity of thermal detectors can approach or even exceed that of photoelectric converters without the need for the mass, volume, and power required for cooling.

Currently, several types of thermal detectors are used in uncooled imaging systems. The characteristics of some of these systems are summarized below.

Resistive Microbolometers: Currently available Vanadium Oxide devices have an NE$\Delta$T of about 50 mK, with the best achievable NE$\Delta$T of about 20 mK. Magneto resistive devices can have conversion sensitivity of up to about 15%, although none has yet been built into a practical device. Vanadium Oxide has a conversion sensitivity of about 2.5% per degree and has a noise limitation, in that Johnson noise is created when the resistor is read out with a current. These limitations lead to theoretical limitations in the best NE$\Delta$T that these detectors can achieve. In addition, there are cost implications associated with exotic material fabrication.

Ferroelectric Microbolometers: The best BST (BaSrTiO$_3$) detectors on the market have good conversion sensitivity but poor thermal isolation, which results in an NE$\Delta$T close to that of resistive detectors. This is because the bulk material has high thermal capacity. In order to scan the detector at a 30-Hz frame rate, therefore, the thermal time constant must be reduced to about 10 msec by lowering the thermal resistance. There is continuous research in thin film ferroelectric (TFFE) materials such as lead titanate that promise to deliver high conversion sensitivity with lower thermal capacity.

Microcantilever with Capacitor Readout: Measured conversion sensitivity of this device is 50% per degree, achieved through mechanical advantage. Johnson noise is eliminated so that the sensitivity is limited by the noise in the read-out amplifier. Thermal isolation has been measured in thin film amorphous hydrogenated silicon carbide at 10 times greater than silicon nitride. The theoretical NE$\Delta$T limit is less than 5 mK.

Microcantilever with Field Emitter Readout: The conversion sensitivity is greater than 100% per degree and may be as high as 1,000% per degree. However, the field emission process is very noisy so that the predicted NE$\Delta$T using this method is about 80 mK. Future research into the theoretical noise limitations of field emitters would be required to optimize this structure. Thermal isolation is. equivalent to the other methods of isolating microcantilevers.

Microcantilever with Reflected Optical Readout: The conversion sensitivity can vary dramatically depending on the particular geometry. At present it is not clear what noise source is dominant for these optical readouts. The thermal isolation is the same as for other microcantilever methods. The conversion sensitivity can vary dramatically depending on the particular geometry.

SUMMARY OF THE INVENTION

The present invention is an optomechanical radiant energy detector comprising a substrate having a principal waveguide and a cantilever arm including a radiant energy absorber, an anchor, an isolation arm, an actuator, and a coupling waveguide. The anchor is coupled to the substrate, and the isolation arm is coupled to the anchor and the radiant energy absorber. The coupling waveguide is coupled to the actuator proximate to the principal waveguide. Also, the actuator is coupled to the isolation arm. Each waveguide emits an evanescent field. The evanescent fields are coupled in response to motion of the cantilever arm induced by incident energy upon the radiant energy absorber.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

MicroOptoElectroMechanical (MOEM) IR detectors utilize a novel combination of integrated MEMS and photonics to achieve high responsivity with low noise. Increasing illumination bends a bimaterial arm that moves a coupling waveguide into the evanescent field of the optical waveguide. This, in turn, modulates the light in the waveguide. This approach can produce extraordinary sensitivity due to the combination of the length of the lever arm and the sensitivity of the evanescent field. It can also have extraordinarily low noise due to the fact that photons are being modulated and not electrons.

The unique advantage of this approach over other uncooled IR detectors is the use of photons rather than electrons to sense the mechanical response of a MEMS structure to infrared energy. With electron sensing, the sensitivity of the detector is limited by noise inherent in the electronic amplification needed to produce a useful signal. In a detector, in accordance with the present invention, however, externally generated waveguided laser light is modulated to generate the detector response. This light can be increased to improve the signal-to-noise ratio (SNR).

Figure 1:
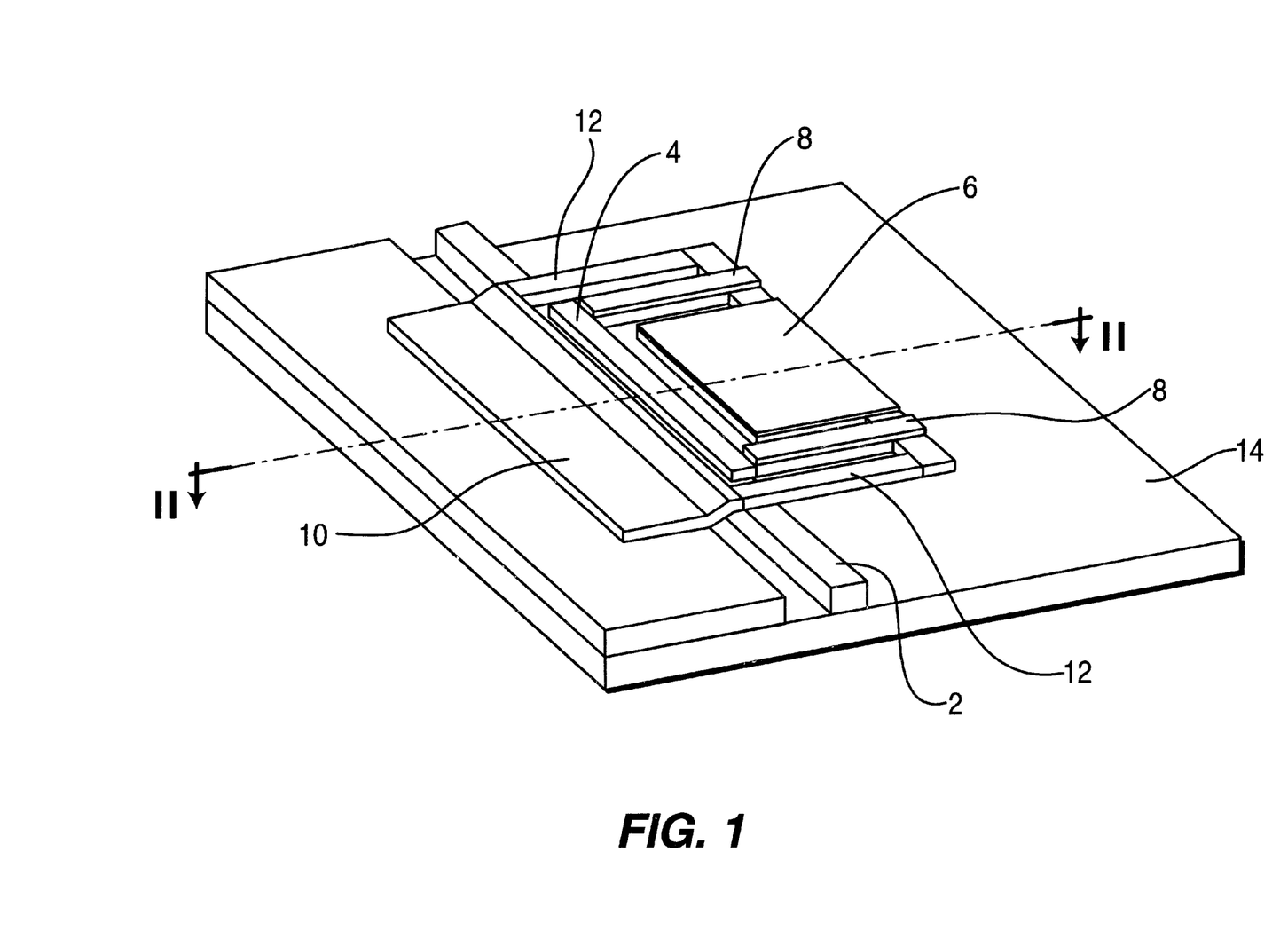
FIG. 1 is a perspective drawing showing components of an exemplary embodiment of a MicroOptoElectroMechanical (MOEM) structure in accordance with the present invention.

FIG. 1 is a perspective drawing depicting components of an exemplary embodiment of a MicroOptoElectroMechanical (MOEM) structure in accordance with the present invention. The MOEM structure of FIG. 1 comprises a principle waveguide 2, a coupling waveguide 4, a radiant energy absorber 6, a pair of thermal actuators 8, an anchor 10, isolation arms 12, and a substrate 14. The coupling waveguide 4 is a movable waveguide section positioned in proximity to the principle waveguide 2 and coupled to the actuators 8. The radiant energy absorber 6 senses visible, IR, or other incident radiation. The anchor 10 and the isolation arms 12 provide support and thermal/electrical isolation between the radiant energy absorber 6 and the substrate 14. The structure depicted in FIG. 1 creates an uncooled IR sensor that can modulate the light contained in the principal waveguide 2 by moving the coupling waveguide 4 close to the principal waveguide. In an exemplary embodiment of the invention, the actuators 8 are formed by a bimaterial structure consisting of a sandwich of amorphous hydrogenated silicon carbide and aluminum. This bimaterial element is extremely sensitive to small changes in temperature, and produces vertical motion at the coupling guide end of the cantilever of ~0.05 $\mu m/° C$.

In an exemplary embodiment of the invention, incident radiant energy is focused or transmitted to the photoreceptive surface of the radiant energy absorber 6 by well known means, not shown in FIG. 1 (e.g., lenses). By absorbing the radiant energy, the photoreceptive surface exhibits a physical response. For example, incident infrared (IR) light causes a temperature rise in an absorbing material, or radiant ultraviolet (UV) or X-ray energy releases photoelectrons producing an electric charge. The physical response of the photoreceptive surface causes the actuator 8 to move. This motion is caused by the differing thermal expansion of materials (i.e. the bimaterial effect), in the case of increased incident thermal energy, or electrostatic force in the case of an electric charge. The degree of motion of the actuator 8, which in turn moves the coupling waveguide 4, is proportional to the intensity of the incident radiant energy. The displaced coupling waveguide 4 interacts with the evanescent field of the principle waveguide 2, causing reflection, attenuation, and/or phase delay in the principal waveguide 2. Motion of the coupling waveguide 4 on the order of one micron can cause changes in the attenuation and thereby modulate the intensity of light in the principal waveguide 2. This modulation is thus a measure of the magnitude of the incident radiant energy on the radiant energy absorber 6.

The substrate 14 functions as the base upon which the MOEM structure is fabricated. In an exemplary embodiment of the invention, the substrate 14 provides good adhesion to the material used for the principal waveguide 2. In another exemplary embodiment of the invention, the substrate 14 has a lower index of refraction than the principal waveguide material to prevent the optical field from spreading into the substrate 14. In yet another exemplary embodiment of the invention, the substrate 14 is formed from either $SiO_2$ (Quartz) or $Al_2O_3$ (Sapphire) to provide very low optical loss.

In an alternate embodiment of the invention, instead of actuator motion being caused by thermal expansion of materials, actuator motion is caused by the attractive force resulting from a voltage induced on the absorber region by incident radiation. The degree of motion of the actuator, which in turn moves the coupling waveguide, is proportional to the intensity of the voltage. Interaction between the waveguides is the same as previously described.

Figure 2:
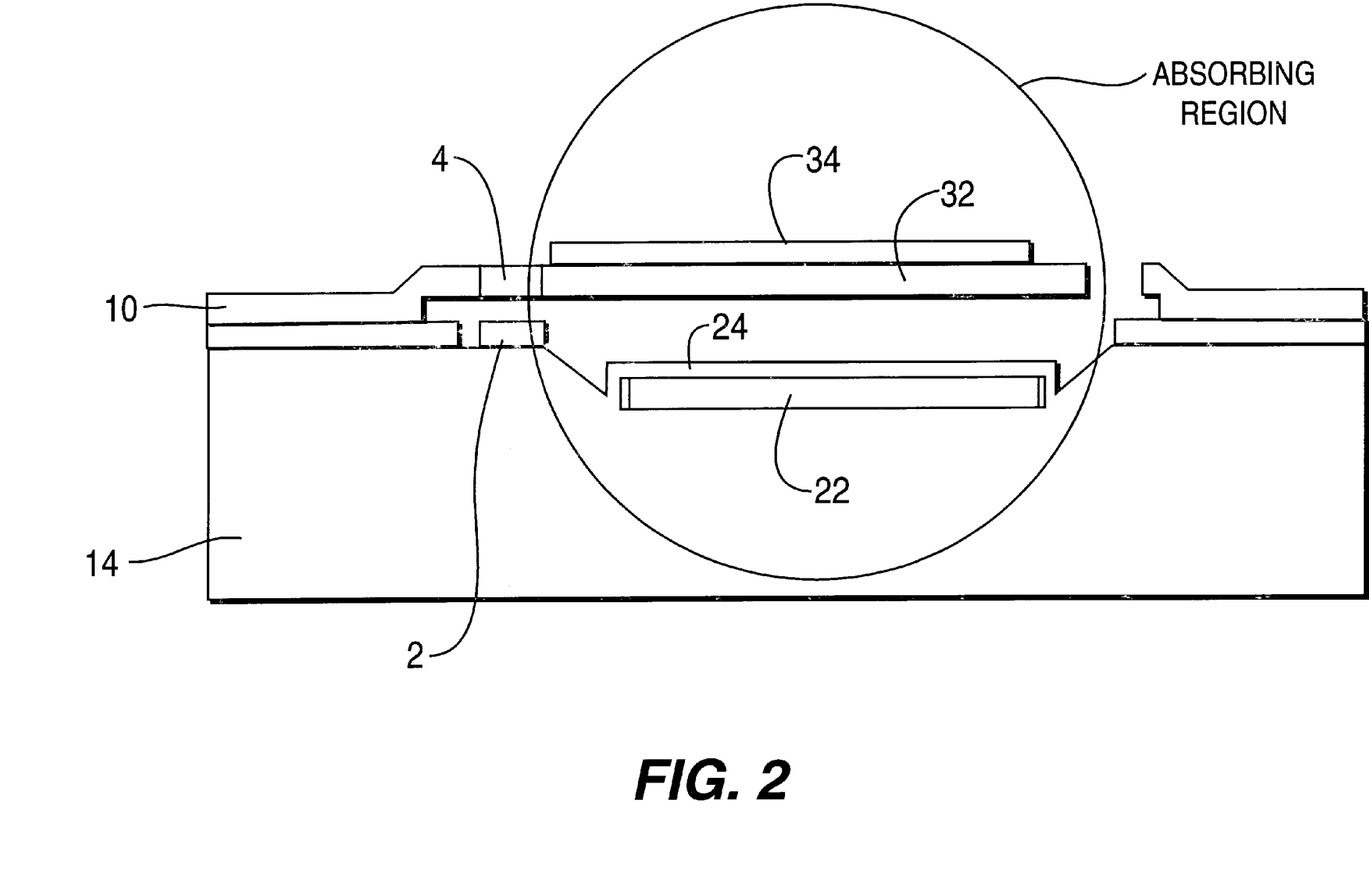
FIG. 2 is a cross sectional view of the structure shown in FIG. 1 a showing an exemplary embodiment of an IR absorber.

The dashed line, II—II, in FIG. 1 shows the location of the cross sectional view of FIG. 2. FIG. 2 is a cross sectional view of an exemplary embodiment of an IR absorber. The radiant absorber region, which is circled in FIG. 2, is fabricated from a stack of materials designed to concentrate the radiant energy onto the surface of a conductor. Its function is to convert the incident radiant energy into heat, thereby raising the local temperature. Two parameters characterize the absorber, the emissivity and the fill factor. In this exemplary embodiment of the invention, high emissivity is created by forming a wide-band IR resonator with peak absorption of light having a wavelength of approximately 10 $\mu$m.

In an exemplary embodiment of the invention, the radiant absorber 6 is created by stacking the following materials on the substrate 14: aluminum (Al), alumina ($Al_2O_3$), silicon dioxide ($SiO_2$), silicon carbide (SiC), and titanium tungsten (TiW). These exemplary materials possess the appropriate characteristic properties for each layer. The Al layer 22 acts as a mirror to reflect a broad band of radiant energy. The $A_2O_3$ layer 24 is a passivation layer that prevents the release etch from attacking the Al layer 22. The $SiO_2$ layer 26 (not shown in FIG. 2) is a sacrificial layer that is removed during release. The SiC layer 32 is an amorphous material that is an extremely poor thermal conductor, an electrical insulator, and a good optical guiding material. The TiW layer 34 forms a top metal film that is electrically matched to the free space impedance. In an exemplary embodiment of the invention, in an attempt to produce optimum performance, the sheet resistance of the film is 377 $\Omega$/square. The absorber is equivalent to a shorted waveguide terminating a resistive load, as such, its absorption as a function of wavelength may be computed. In an exemplary embodiment of the invention, the electrical length of the path between the resistive layer and the mirror is equal to ¼ of the wavelength at which the peak response is desired. Although exemplary embodiments of the invention as described herein define an absorber mirror, exemplary embodiments without an absorber mirror are contemplated.

Referring to FIG. 1, in an exemplary embodiment of the invention, the support system comprises two parts, the anchor 10 and the isolation arm 12. The anchor 10 provides the mechanical attachment of the released structure to the substrate. The isolation arm 12 provides mechanical support and it inserts a high thermal resistance between the absorber 6 and the substrate 14. When radiant energy impinges on the absorbing structure 6, it generates heat. This heat may be dissipated as IR radiation, or it may be conducted down to the substrate 14. The heat is not removed by convection since the device is operated in vacuum. If the thermal resistance between the absorber 6 and the substrate 14 is significantly lower than the radiation thermal resistance, then most of the heat is shunted down to the substrate.

Figure 3A:
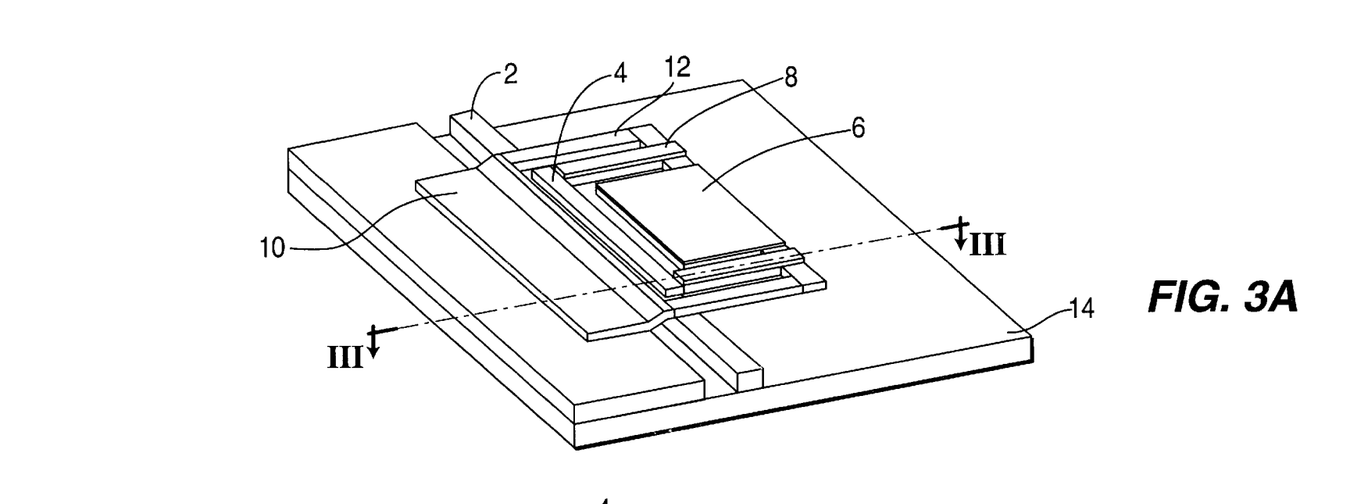
FIG. 3A is a perspective drawing depicting components of an exemplary embodiment of a MOEM structure indicating the location of the cross sectional view of FIGS. 3B.
Figure 3B:
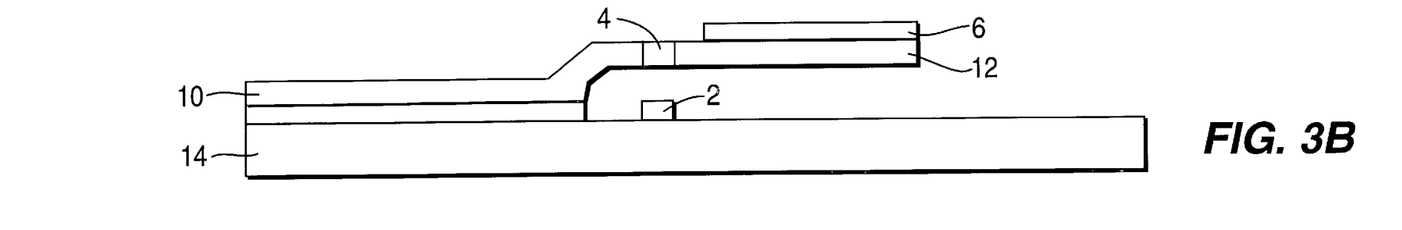
FIG. 3B is a cross sectional view of an exemplary embodiment of the actuator 8, shown in FIG. 3A, at a neutral temperature.
Figure 3C:
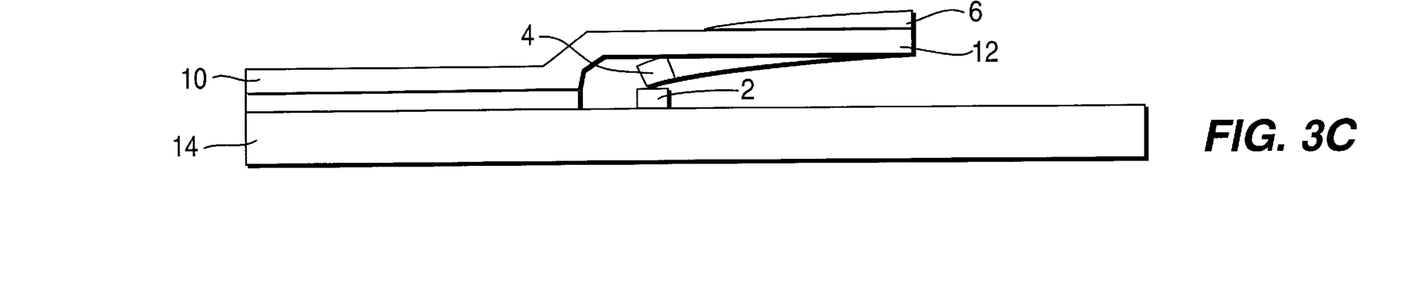
FIG. 3C is a cross section view of an exemplary embodiment of the actuator 8, shown in FIG. 3A, at an elevated temperature relative to the neutral temperature.

FIG. 3A, is a perspective drawing depicting components of an exemplary embodiment of a MOEM structure indicating the location of the cross sectional views of FIGS. 3B and 3C. The dashed line, III—III, in FIG. 3A shows the location of the cross sectional views of FIGS. 3B and 3C. FIG. 3B is a cross sectional view of an exemplary embodiment of the actuator 8 at a neutral temperature. FIG. 3C is the same cross sectional view of the actuator 8 at an elevated temperature relative to the neutral temperature. In an exemplary embodiment of the invention, the thermal actuator 8 is a bimaterial arm composed of two materials having significantly different coefficients of thermal expansion, $\alpha$. As temperature increases at the bimaterial arm, the material with the larger coefficient of expansions attempts to elongate more than the other material. This causes the actuator to bend.

In FIG. 3B, the actuator 8, (hidden behind the isolation arm 12) is in line with isolation arm 12 and is essentially flat. In an exemplary embodiment of the invention, the actuator 8 is flat at room temperature. If there is some curvature at room temperature (e.g., due to residual stresses), the device can be adjusted to the neutral temperature (e.g., with a Peltier device placed below the substrate). In an exemplary embodiment of the invention, the relative position of principal waveguide 2 to the coupling waveguide 4 is such that the coefficient of coupling between the two is minimal.

FIG. 3C shows the cross-section of the exemplary MOEM structure at an elevated temperature relative to the neutral temperature. Increasing temperature causes the actuator 8 to bend downward. As a result, the coupling waveguide 4 moves closer to the principal waveguide 2, which results in an increase in the coupling coefficient. The increase in coupling results in more light being coupled out of the principal waveguide 2 into the coupling waveguide 4, and out of the coupling waveguide 4 and into the principal waveguide 2.

The coupling waveguide 4 is positioned proximate to the principal waveguide 2 and is supported by the actuator arms 8. The coupling waveguide 4 is close enough to the principal waveguide 2 so that it interacts with the evanescent field of the principal waveguide 2. As temperature increases, the actuator arm 8 bends downward, moving the coupling waveguide 4 closer to the principal waveguide 2. This increases the coupling and therefore increases the amount of light removed from the principal waveguide 2 and also increases the amount of light removed from the coupling waveguide 4. In an exemplary embodiment of the invention, to increase performance, the coupling waveguide 4 is identical in material and cross-section to the principal waveguide 2.

In an exemplary embodiment of the invention, the principal waveguide 2 is thin enough and constructed of a low loss material to ensure that the evanescent field is large. Also, in this exemplary embodiment, both the principal waveguide 2 and the coupling waveguide 4 are constructed of materials having similar properties. These properties include, high thermal resistivity to provide thermal isolation in the isolation arm, low thermal expansion to cause high sensitivity of the bimaterial arm, low optical loss to maximize the laser power delivered to the pixels, and compatibility with silicon IC processing. Plasma enhanced chemical vapor deposition (PECVD) of hydrogenated SiC and SiN produces thin IC compatible films of materials that satisfy the above properties. SiC has the advantage of higher thermal resistivity while SiN has the advantage of lower optical loss. Both of these glass-like materials are highly resistant to the chemical etches used in silicon IC fabrication.

Figure 4A:
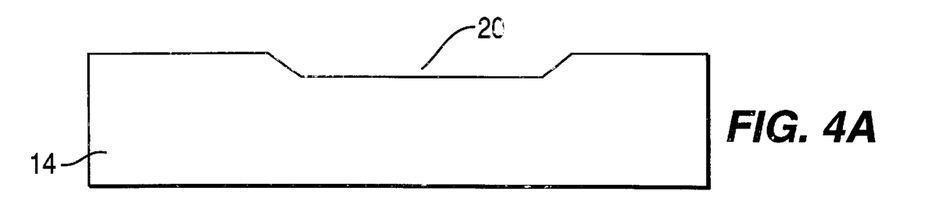
FIG. 4A is a cross sectional view showing a substrate on which the actuator shown in FIG. 1 may be formed.
Figure 4B:
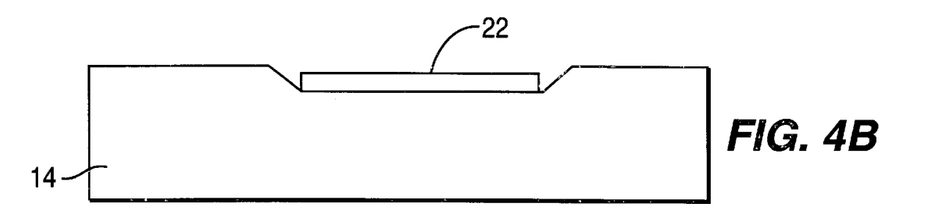
FIG. 4B is a cross sectional view which is useful for describing the formation of the absorber mirror on the substrate.
Figure 4C:
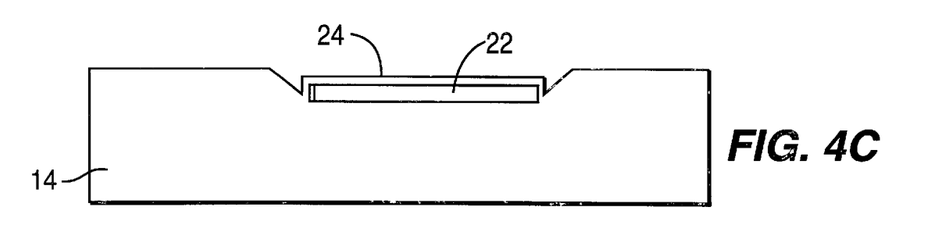
FIG. 4C is a cross sectional view which is useful for describing the passivation of the absorber mirror.

FIGS. 4A–4I are appropriately referenced to describe an exemplary device fabrication process. In an exemplary embodiment of the invention, the coupling waveguide is very close to the principal waveguide (e.g., approximately 0.1–0.2 μm) and the absorber metal is approximately 2.5 μm away from the Al mirror. Thus, the first few steps of the fabrication process place the Al mirror into a recess below the surface of the substrate wafer. FIG. 4A is a cross sectional view of an exemplary embodiment of the substrate. The exemplary process starts with a polished sapphire substrate 14, depicted in FIG. 4A. A recess region 20 is defined in the substrate 14 by depositing a photoresist on the upper surface of the substrate 14 except where the recess is to be located. Next, the substrate wafer 14 is ion beam etched to form the recess 20. The photoresist is then cleaned and stripped. Next the absorber mirror is defined, Al is deposited, and the photoresist is cleaned and stripped from the substrate. FIG. 4B is a cross sectional view of the absorber mirror 22 on the substrate 14. As depicted in FIG. 4C, $A_2O_3$ is sputtered on the absorber mirror to form a passivation coating 24. Although exemplary embodiments of the invention as described herein define an absorber mirror, exemplary embodiments without an absorber mirror are contemplated.

Figure 4D:
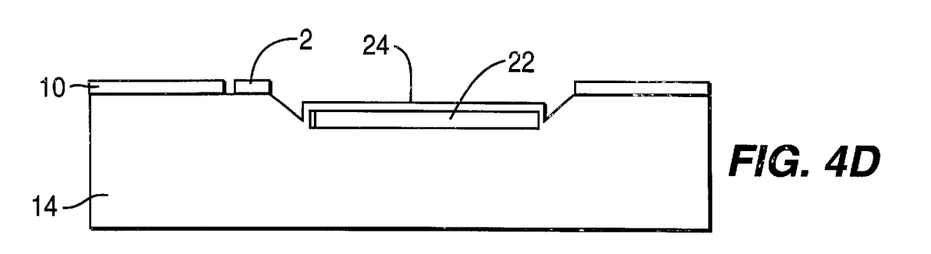
FIG. 4D is a cross sectional view which is useful for indicating the location of the principal waveguide region and the anchor region, at a stage of the fabrication process.
Figure 4E:
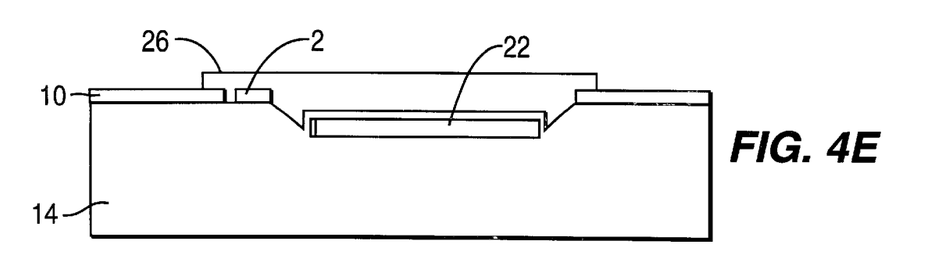
FIG. 4E is a cross sectional view indicating of the structure indicating the sacrificial layer.

The next sequence of exemplary steps results in the fabrication of the anchor and principal waveguide regions. Referring to FIG. 4D, waveguide material (e.g., SiC) is deposited on the substrate 14, then waveguide 2 and anchor regions 10 are defined, next the SiC is etched, and the photoresist is then cleaned and stripped. FIG. 4D is a cross sectional view indicating the location of the principal waveguide region 2, and the anchor region 10, at this stage of the fabrication process. As depicted in FIG. 4E, a sacrificial layer 26 (release layer) is then deposited, and an anchor region 10 is defined through the sacrificial layer 26. The photoresist is then cleaned and stripped.

Figure 4F:
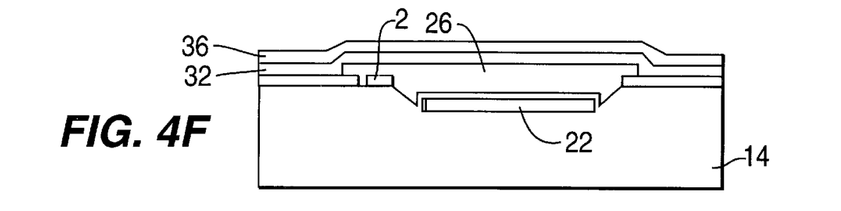
FIG. 4F is a cross sectional view and a top view of the structure during a step in the fabrication process showing the absorber metal layer, the SiC layer, and the bimaterial metal layer.
Figure 4G:
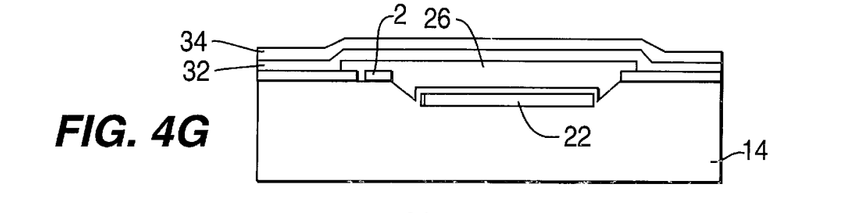
FIG. 4G is a cross sectional view and a top view of the structure during a step in the fabrication process after the definition and etching of the bimaterial metal layer.
Figure 4H:
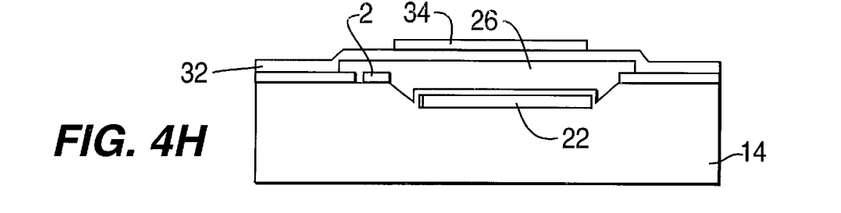
FIG. 4H is a cross sectional view and a top view of the structure during a step in the fabrication process after the definition and etching of the absorber metal is defined and etched.
Figure 4I:
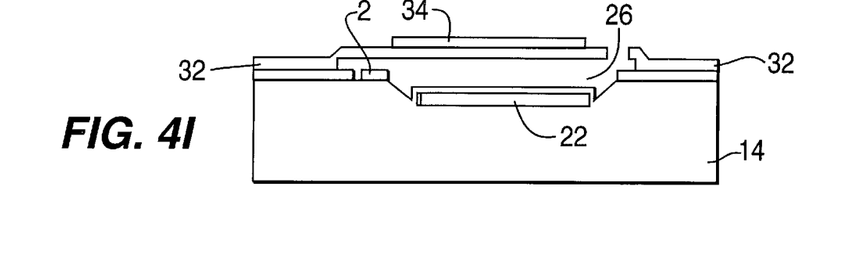
FIG. 4I is a cross sectional view and a top view of the structure during a step in the fabrication process after the definition and etching of the SiC layer.
Figure 4J:
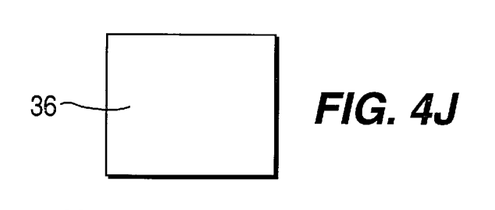
FIG. 4J is a top view of the structure shown in FIG. 4F.
Figure 4K:
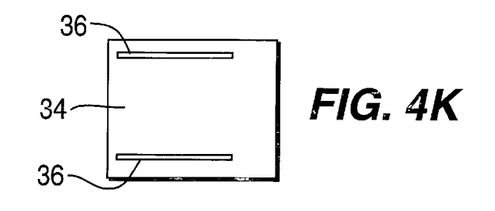
FIG. 4K is a top view of the structure shown in FIG. 4G.
Figure 4L:
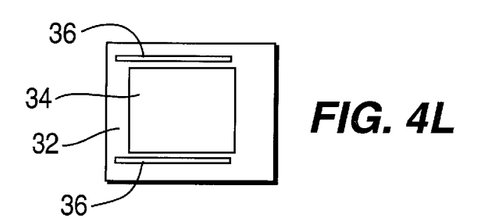
FIG. 4L is a top view of the structure shown in FIG. 4H.
Figure 4M:
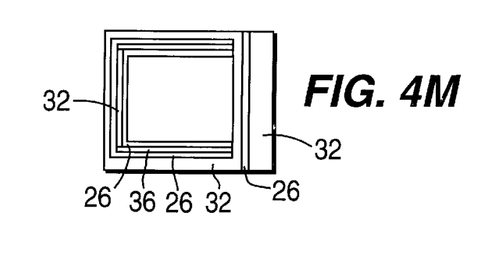
FIG. 4M is a top view of the structure shown in FIG. 4I.

The next sequence of exemplary steps completes this embodiment of the structure. FIGS. 4F, 4G, 4H, and 4I depict cross sectional views of exemplary embodiments of the invention at specific stages of the fabrication process. FIGS. 4J, 4K, 4L, and 4M depict top views of FIGS. 4F, 4G, 4H, and 4I, respectively. Referring to FIG. 4F, after the photoresist is cleaned and stripped in the previous step, a layer of SiC 32 is deposited on the structure. Next, a layer of absorber metal 34 is deposited on top of the SiC layer 32. On top of this, a layer of material 36 (e.g., Al), that with the SiC, forms the bimaterial element, is deposited. At this stage of the fabrication process, only material 36 is visible from the top view shown in FIG. 4J. Next, the material 36 is defined and etched, and the photoresist is cleaned and stripped. This results in the structure depicted in FIG. 4G. The top view in FIG. 4K and the cross sectional view depicted in FIG. 4G show the bimaterial regions 36 and absorber metal 34 remaining after the above definition and etching. Referring to FIG. 4H next, the absorber metal is defined and etched, and the photoresist is cleaned and stripped. Top view 4L and the cross sectional view of FIG. 4H show the absorber metal 34, the bimaterial regions 36, and the SiC regions 32 remaining at this stage of the fabrication process. Next, the SiC 32 is defined and etched, and the photoresist is cleaned and stripped, resulting in the structure depicted in FIG. 4I. The top view depicted in FIG. 4M and the cross sectional view of FIG. 4I show the structure of the device after removing the sacrificial layer 26 (release layer). Finally, the process is completed by releasing (removing the sacrificial layer 26) and drying the structure.

The performance of a MOEM device is generally limited by the capabilities of the fabrication process. The minimum line width and minimum line spacing determine the tradeoff between yield and performance. For example, the pixel geometry of an imager is determined in part by the imager requirements, the fabrication design rules, and the material deposition processes. An exemplary 50 by 50 μm square pixel is assumed to facilitate comparison with other uncooled imaging devices.

Figure 5:
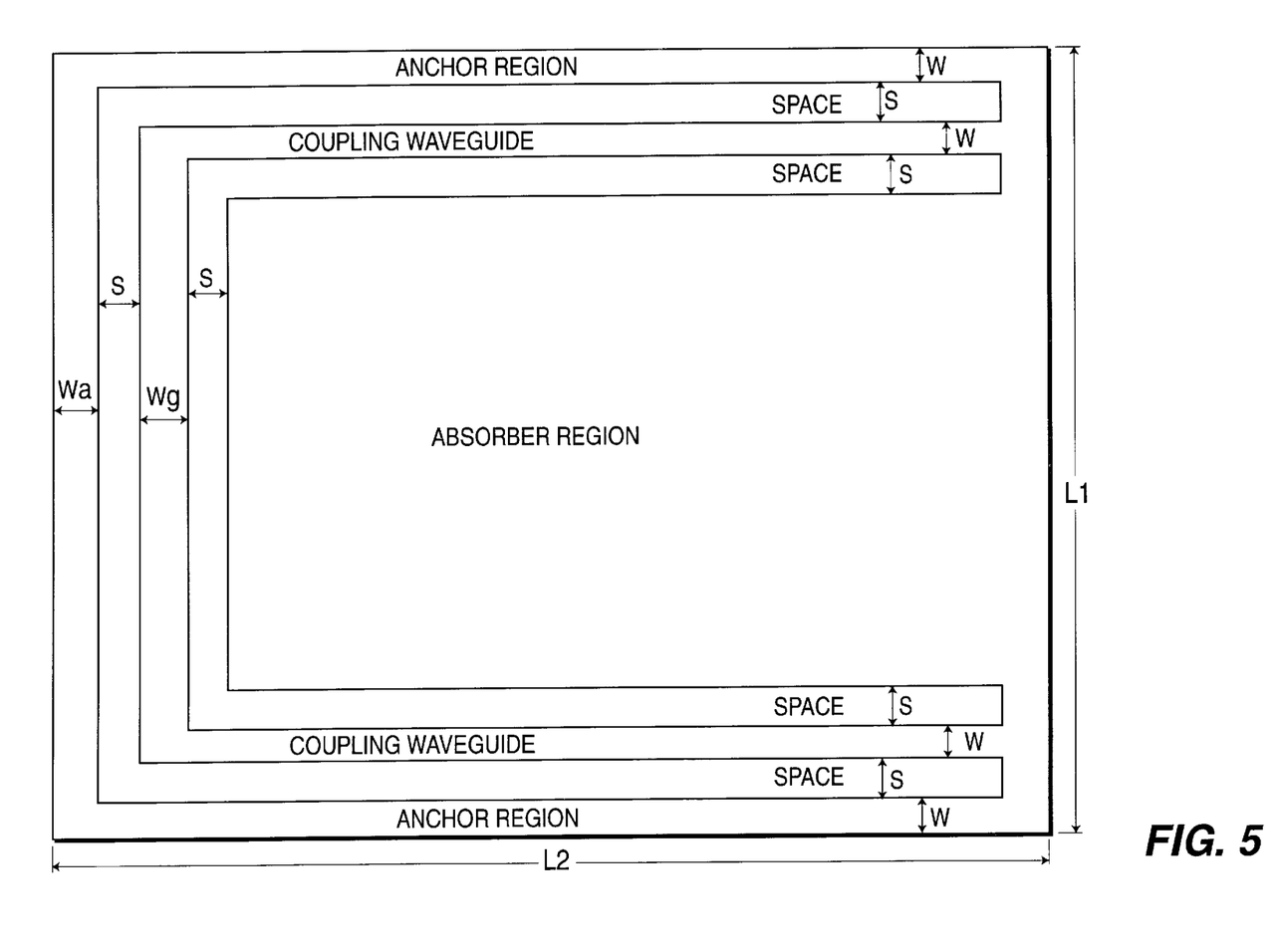
FIG. 5 is an illustration of an exemplary embodiment of a pixel structure.

FIG. 5 is an illustration of an exemplary embodiment of a pixel structure. As depicted in FIG. 5, each pixel height contains four strips (i.e., anchor and coupling waveguide regions) and four spaces plus one extra space to separate pixels. Referring to FIG. 5, the pixel width contains two lines and two spaces plus one extra space to separate neighboring pixels, therefore the fill factor is given by equation (1).

$$f=(L1-4w-5s)(L2-w_g-w_a-3s)/L1L2. \quad (1)$$

In this exemplary embodiment, the pixel comprises three layers, the support layer, the absorber layer, and the bimaterial layer. The support layer comprises the coupling waveguide and the support arms. The actuator arm comprises the support layer and the bimaterial layer, which is a high thermal expansion metal. The absorber comprises the support layer and a very thin metal with a sheet resistance approximately between 300 to 400 ohms/square. Table 1 shows exemplary geometric pixel parameters for a conservative design and an aggressive (better performance) design.

TABLE 1

Pixel Geometric Parameters.

| Symbol | Definition | Aggressive | Conservative | Units |
|--------|------------|------------|--------------|-------|
| s | Design rule for minimum spacing of lines | 1 | 2 | μm |
| w | Design rule for minimum line width | 2 | 3 | μm |
| L | Pixel side | 50 | 50 | μm |
| $A_p$ | Pixel area 50 × 50 μm | 2500 | 2500 | μm² |
| $w_a$ | Anchor width | 2 | 3 | μm |
| f | Absorber fill factor | 0.64 | 0.43 | |
| $t_I$ | Support material thickness | 0.2 | 0.3 | μm |

In an exemplary embodiment, a reference laser is used as the light source for the principle waveguide. Also, in this exemplary embodiment, optical coupling of the reference laser source to the principal guide is made through a grating coupler etched into the waveguide.

Performance of IR imaging arrays is best characterized by the NEΔT NEΔT is a measure of the minimum discernible temperature change. NEΔT for any system can be computed from the quadrature addition of individual contributions, $NE\Delta T_k = \beta N_{rms}/S_k$, where $N_{rms}$ is the rms value of the noise source associated with $S_k$, the signal sensitivity per degree K, at the detector. β is the thermal transfer coefficient, $\beta = dT_s/dT_d$, where $T_s$ and $T_d$ are the scene and detector temperatures, respectively.

Figure 6A:
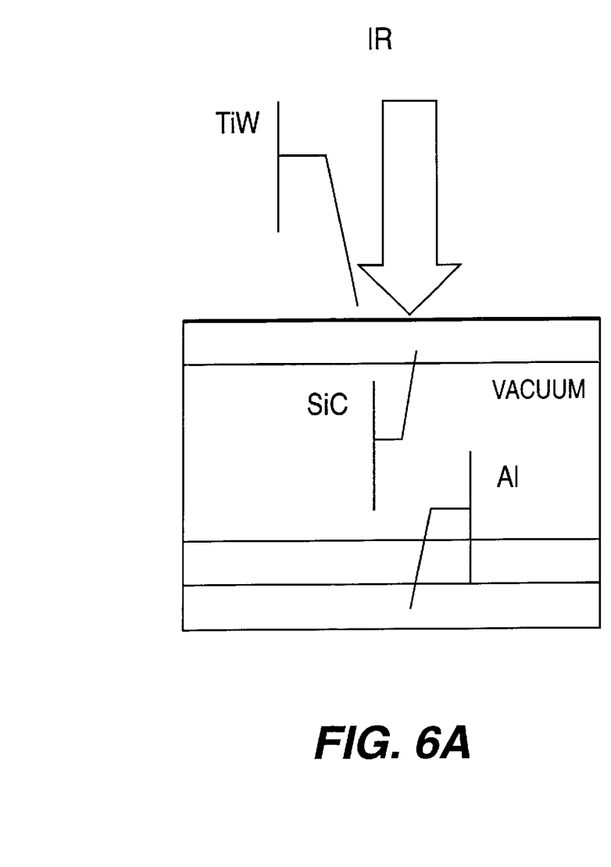
FIG. 6A is a cross sectional view of an absorber depicting IR absorption.
Figure 6B:
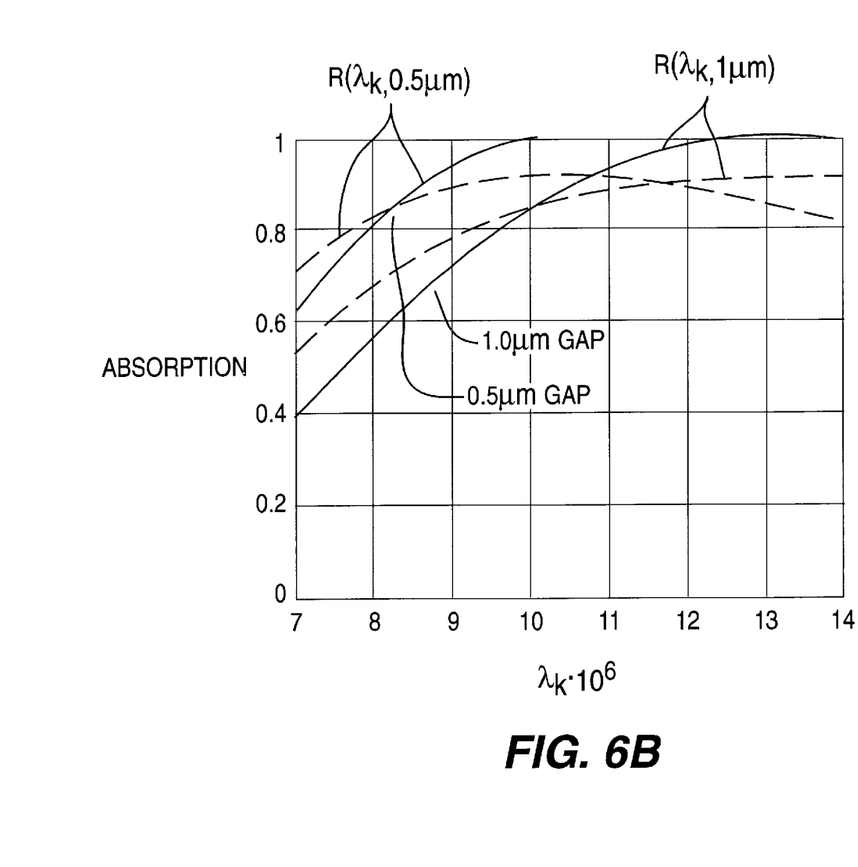
FIG. 6B is a graph depicting the absorber spectral response for the structure in FIG. 6A.

The thermal transfer coefficient depends upon the optics, the optical spectral band, and the thermal resistance of the device. Specifically, the thermal transfer coefficient, $\beta = 4F^2 B_\lambda (1+R_{thr}/R_c)$, where F is the F-number of the lens, $R_{thr}$ and $R_c$ are the arm radiation and conduction thermal resistances, respectively, and $B_\lambda$, which is wavelength dependent, is inversely proportional to the spectral fraction of the black body radiation reaching the absorber, i.e., $B_\lambda = \sigma T^4 / \int M_e(\lambda,T) d\lambda$, where $\sigma$ is the Stefan-Boltzman constant, T is temperature, and $\int M_e (\lambda,T)$ is the total black body absorption. For purposes of comparison between different approaches to uncooled IR imaging, the F-number is set to unity and the spectral band to 8 to 14 $\mu$m. $B\lambda$ evaluates to 2.649. The radiation resistance is set by the pixel area, emissivity, and fill factor, i.e., $R_{thr} = 1/4\sigma\epsilon f A_p T^3$, where $\epsilon$ is the emissivity of the material. The absorber is a layered structure from top to bottom consisting of an Al reflector on the substrate, a thin insulator, vacuum, the SiC support layer, and the thin film TiW layer. Referring to FIG. 6A, IR energy enters from the top. The absorber spectral response is relatively wide band. It depends upon the sheet resistance and the vacuum gap. Mismatching sheet resistance to free space impedance widens the bandwidth and reduces the sensitivity to the gap, although the peak emissivity is reduced. The solid lines in FIG. 6B, are matched, the dashed lines have sheet resistance equal to 200 ohms/square. Ideally, the sheet resistance is matched to the free space impedance and the optical path from the top to the Al reflector is ¼ of the wavelength at the center of the spectral band. The spectral response can be computed using the transmission matrix technique where each layer is replaced by a section of transmission line. Based upon the results shown in FIG. 6B, in an exemplary embodiment of the invention, a constant emissivity of 0.8 is used in subsequent calculations.

The conduction thermal resistance is $R_c = L_i / \eta_{SiC} w_i t_i$, where $K_{SiC}$ is the thermal conductivity of SiC, the subscript "i" refers to the suppost insulator (e.g., SiC), and t is the thickness of the material. The isolation arms are composed of hydrogenated amorphous SiC, which exhibits low thermal conductivity approximately equal to 0.34 W/(meter-Kelvin); it is electrically insulating and demonstrates extremely high chemical inertness. Table 2 shows thermal conduction parameters for a conservative design and an aggressive design (better performance).

TABLE 2

Thermal Conduction Parameters

| Symbol | Definition | Aggressive | Conservative | Units |
|---|---|---|---|---|
| $R_{thr}$ | Radiation thermal resistance | $1.283 \times 10^8$ | $1.92 \times 10^8$ | K/W |
| $R_{th}$ | Conduction thermal resistance | $1.69 \times 10^8$ | $0.72 \times 10^8$ | K/W |
| $(1 + R_{thr}/R_{th})$ | Thermal shunting factor | 1.76 | 3.67 | |
| $\beta$ | Thermal transfer function | 18.6 | 38.9 | |

The essential point developed above is the extremely high value of thermal resistance that provides near ideal temperature transfer from the scene to the detector. All other forms of uncooled IR imagers require some conductive path from the substrate to the absorber region to provide electrical bias. Even in cases that require very small currents so that the electrical resistance can be high, it is extremely difficult to have electrical conduction without heat conduction. A reasonable thin conducting film is at least 50 angstroms in thickness.

Figure 7:
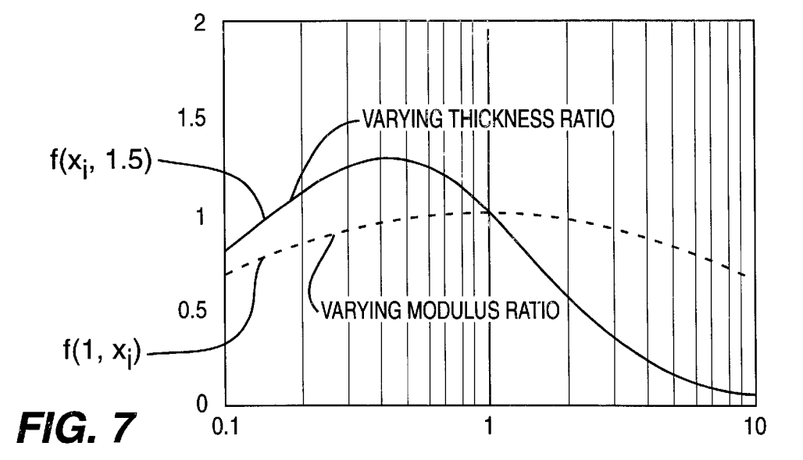
FIG. 7 is a graphical depiction of the relationship between bimaterial sensitivity and the relative thickness and stiffness of the two materials.

The equation for the movement of the end of a bimaterial arm is $$S_T^y = \frac{dy}{dT} = \frac{3}{8} \frac{L_m^2}{t_m} (\alpha_m - \alpha_i) f(\tau, \xi)$$

where the subscript 'i' refers to the support insulator (e.g., SiC), the subscript 'm' refers to the high thermal-expansion metal (e.g., Al), and t refers to thickness. The function $f(\tau,\xi)$ depends upon the ratio of the thickness of the insulator to that of the metal, $\tau$ and upon the ratio of Young's modulus for the insulator to that of the metal, $\xi$. FIG. 7 shows this relationship. Bimaterial sensitivity is a relatively weak function for the relative thickness and stiffness of the two materials. Table 3 shows actuator parameters for a conservative design and an aggressive design (better performance).

TABLE 3

Actuator Parameters

| Symbol | Definition | Aggressive | Conservative | Units |
|---|---|---|---|---|
| $L_m$ | Bimaterial arm length L-s-w | 46 | 44 | $\mu$m |
| $\alpha_m$ | Expansion coefficient of metal | 23 (Al) | 14 (Au) | ppm/K |
| $\alpha_i$ | Expansion coefficient of insulator | 4 | 4 | ppm/K |
| $S_T^y$ | Sensitivity of the tip position to temperature | 0.075 | 0.05 | $\mu$m/K |

The movement of the coupling waveguide is sensed by interacting with the evanescent field surrounding the principal waveguide. In an exemplary embodiment of the invention, the waveguides are composed of hydrogenated amorphous SiC, and are 0.3 micrometers thick and 2 micrometers wide. Also, in an exemplary embodiment of the invention, the principal waveguide lies on a glass substrate with index of 1.3, at a light wavelength of 0.7 micrometers, or on a sapphire substrate with an index of 1.8.

Sources of noise include photon shot noise, noise from the reference laser and coupling losses to the principle waveguide, mechanical noise from the suspended platform, and detector noise. The inventors have determined that an estimate of the value of NE$\Delta$T as a function of the laser power received at the detector can be formulated by combining all of these sources of noise. When this laser power exceeds approximately 10 $\mu$W, NE$\Delta$T is limited by the photon shot noise of the IR energy absorbed at the pixel, and is independent of laser power. With less laser power, the noise becomes dominated by the noise level of the laser light detector, so that NE$\Delta$T rises with decreasing laser power. In an exemplary embodiment of the invention, alterations of the MOEM design to improve sensitivity (e.g., thinner materials, narrower lines and spaces, and improved bimaterial based on replacing aluminum by gold) will result in values of NE$\Delta$T of 1 mK, when the laser power detected is only 10 $\mu$W.

Figure 8:
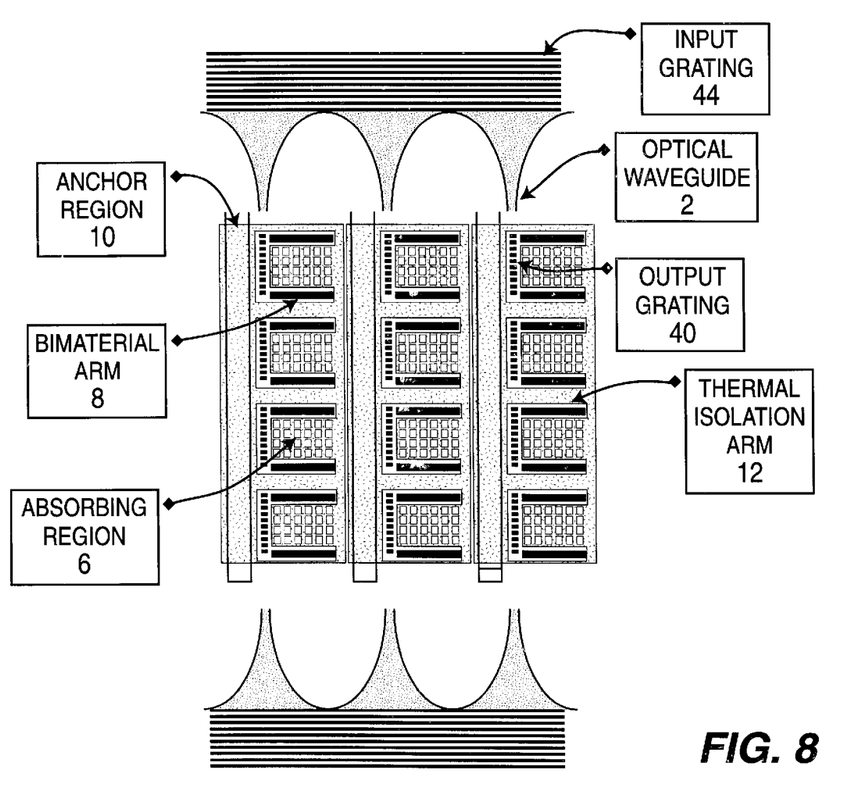
FIG. 8 is an illustration of a plurality of optomechanical radiant energy detectors in an exemplary imaging device.

FIG. 8 is an illustration of a plurality of optomechanical radiant energy detectors in an exemplary imaging device. In an exemplary embodiment of the invention, each optomechanical radiant energy detector in FIG. 8 represents a pixel of the resultant image. The intensity of energy detected by each absorbing region 6 results in a corresponding degree of motion in respective bimaterial arms 8. A reference laser (not shown) is used to provide an optical source for the principal waveguides 2. Coupling of the evanescent fields of the principal waveguides and coupling waveguides is realized by the grating output coupler 40. Optical coupling of the reference laser source to the principal guide is through a grating input coupler 44 etched into the waveguide. The formation, principle of operation, and use of grating couplers is described in the following documents: U.S. Pat. No. 5,450,512, U.S. Pat. No. 4,622,662, U.S. Pat. No. 4,274,706, U.S. Pat. No. 4,279,464, and U.S. Pat. No. 4,696,536. In an exemplary embodiment of the invention, processing of optical signals in the principal waveguide, coupling waveguide, or both, is performed to form an image. For example, output grating 40 is formed on the coupling waveguide 4. Output grating 40 comprises multiple regions having a different index of refraction than the waveguide 4. In this exemplary embodiment of the invention, lasers of multiple wavelengths may be employed as an optical source emanating from input grating 44. Optical energy provided by the lasers either passes through the principal waveguide 2 or is reflected back, dependent upon the wavelength of the source and the index of refraction in the output grating 40. As described previously, the optical energy in the principal waveguide 2, is modulated in accordance with the interaction between the evanescent fields of the principal waveguide 4 and the coupling waveguide 2. This provides a mechanism for determining the source of the radiant energy (e.g., the specific pixel) to form a resultant image.

Alternatively, the laser source may provide light pulses at a single wavelength, which is reflected by the output optical grating 40. A detector (not shown) may monitor the light pulses reflected back into the principal waveguide by the action of the coupling waveguides. The timing of the reflected pulses indicate which coupling waveguides are interacting with the principal waveguide and the intensity of the reflected pulse indicates the strength of the interaction. From this information, the imaging device may be read on a line-by-line basis.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An optomechanical radiant energy detector comprising:
   a substrate;
   a radiant energy absorber;
   an anchor mechanically coupled to the substrate;
   an isolation arm mechanically coupled to the anchor and the radiant energy absorber;
   a first waveguide having a first waveguide evanescent field, mechanically coupled to the substrate;
   a second waveguide having a second waveguide evanescent field, said second waveguide being positioned in proximity to the first waveguide, and
   an actuator mechanically coupled to the second waveguide, the radiant energy absorber and the isolation arm, wherein the actuator is responsive to incident energy on the radiant energy absorber to move the second waveguide to a position at which the first and second waveguide evanescent fields interact.

2. An optomechanical radiant energy detector in accordance with claim 1, wherein the first waveguide and the second waveguide comprise hydrogenated amorphous SiC.

3. An optomechanical radiant energy detector in accordance with claim 1, wherein the substrate comprises a material selected from one of $SiO_2$ and $Al_2O_3$.

4. An optomechanical radiant energy detector in accordance with claim 1, further comprising an absorber mirror for reflecting radiant energy onto the radiant energy absorber.

5. An optomechanical radiant energy detector in accordance with claim 4, wherein the radiant energy absorber comprises SiC and TiW and the absorber mirror comprises Al.

6. An optomechanical radiant energy detector in accordance with claim 4, wherein the TiW has a sheet resistance between 300 ohms/square and 400 ohms/square.

7. An optomechanical radiant energy detector comprising:
   a substrate;
   a radiant energy absorber for converting incident energy into thermal energy;
   an anchor mechanically coupled to the substrate;
   an isolation arm mechanically coupled to the anchor and the radiant energy absorber for providing thermal resistance between the radiant energy absorber and the substrate and for providing mechanical support for the absorber;
   a first waveguide having a first waveguide evanescent field, mechanically coupled to the substrate;
   a second waveguide having a second waveguide evanescent field, mechanically coupled to the actuator and positioned in proximity to the first waveguide, and
   an actuator mechanically coupled to the second waveguide, the radiant energy absorber and the isolation arm, wherein the actuator is responsive to incident energy on the radiant energy absorber to move the second waveguide to a position at which the first and second waveguide evanescent fields interact.

8. An optomechanical radiant energy detector in accordance with claim 7, wherein the first waveguide and the second waveguide comprise hydrogenated amorphous SiC.

9. An optomechanical radiant energy detector in accordance with claim 7, wherein the substrate comprises a material selected from one of $SiO_2$ and $Al_2O_3$.

10. An optomechanical radiant energy detector in accordance with claim 7, wherein the radiant energy absorber comprises SiC and TiW.

11. An optomechanical radiant energy detector in accordance with claim 9, wherein the TiW has a sheet resistance between 300 ohms/square and 400 ohms/square.

12. A method for fabricating an optomechanical radiant energy detector having a substrate, a first waveguide region, and a cantilever arm including a second waveguide region, an anchor region, an actuator and an absorber, said method comprising the steps of:
   forming said first waveguide region and said anchor region on said substrate;
   depositing a sacrificial layer onto said first waveguide region and said anchor region;
   defining an anchor opening within said sacrificial layer;
   contiguously depositing an amorphous material, an absorber metal, and a bimaterial metal, onto said sacrificial layer and said anchor opening;
   defining and etching said bimaterial metal, said absorber metal, and said amorphous material, to form said actuator, said absorber, and said second waveguide, respectively; and
   etching said sacrificial layer to form the cantilever arm.

13. A method for fabricating an optomechanical radiant energy detector having a substrate, an absorber mirror, a first waveguide region, and a cantilever arm including a second waveguide region, an anchor region, an actuator and an absorber, said method comprising the steps of:
   defining and etching a recess region into said substrate;
   forming an absorber mirror within said recess region;

sputtering a passivation coating onto said absorber mirror;

forming said first waveguide region and said anchor region on said substrate;

depositing a sacrificial layer onto said passivation coating, said first waveguide region, and said anchor region;

defining an anchor opening within said sacrificial layer;

contiguously depositing an amorphous material, an absorber metal, and a bimaterial metal, onto said sacrificial layer and said anchor opening;

defining and etching said bimaterial metal, said absorber metal, and said amorphous material, to form said actuator, said absorber, and said second waveguide, respectively; and etching said sacrificial layer to form the cantilever arm.

14. The method in accordance with claim 13, wherein said absorber mirror comprises Al.

15. The method in accordance with claim 13, wherein said passivation coating comprises $Al_2O_3$.

16. The method in accordance with claim 13, wherein said amorphous material comprises SiC.

* * * * *